United States Patent [19]
Braun et al.

[11] 3,921,495
[45] Nov. 25, 1975

[54] FASTENING MEMBER FOR AN EXPLOSIVE POWDER CHARGE OPERATED SETTING TOOL

[75] Inventors: Josef Braun, Vaduz; Manfred Hartmann, Frastanz; Helmut Oesterle, Feldkirch, all of Austria

[73] Assignee: Hilti Aktiengesellschaft, Liechtenstein

[22] Filed: July 23, 1973

[21] Appl. No.: 381,424

[30] Foreign Application Priority Data

July 31, 1972 Germany.......................... 2237528

[52] U.S. Cl. ............................... 85/10 E; 85/50 R
[51] Int. Cl.² ......................................... F16B 15/00
[58] Field of Search............ 85/10, 10 E, 50 R, 28; 151/38

[56] References Cited
UNITED STATES PATENTS

| | | | |
|---|---|---|---|
| 97,752 | 12/1869 | Billings | 151/38 |
| 1,144,700 | 6/1915 | Edwards | 85/50 R |
| 1,945,005 | 1/1934 | Vachen | 151/38 |
| 3,555,957 | 1/1971 | Hermle | 85/10 E |
| R8,100 | 2/1878 | Hyndman | 85/50 R |

FOREIGN PATENTS OR APPLICATIONS

| | | | |
|---|---|---|---|
| 1,186,840 | 4/1970 | United Kingdom | 85/10 E |
| 1,290,093 | 2/1962 | France | 85/10 E |
| 184,524 | 1/1956 | Austria | 85/10 E |

*Primary Examiner*—Edward C. Allen
*Attorney, Agent, or Firm*—Toren, McGeady and Stanger

[57] ABSTRACT

A fastening member for use in a setting tool operated by an explosive powder charge, consists of a nail having a cylindrically-shaped axially extending shank with two washers positioned in spaced relation on the shank. A frusto-conically-shaped portion of the nail extends and widens in the axial direction from the trailing end of the shank. At least one of the washers is dish-shaped with its hollow surface facing toward the tip or leading end of the nail. The shank of the nail can be knurled, preferably in a herringbone pattern. The trailing end of the frusto-conically-shaped portion terminates in a cylindrically-shaped portion which may project radially outwardly from the frusto-conical portion forming a nail head.

9 Claims, 4 Drawing Figures

FASTENING MEMBER FOR AN EXPLOSIVE POWDER CHARGE OPERATED SETTING TOOL

SUMMARY OF THE INVENTION

The present invention relates to a fastening member for use in a setting tool operated by an explosive powder charge and, more particularly, it concerns a fastening element having a cylindrically-shaped shank on which two washers are positioned in axially spaced relationship.

In explosive powder charge operated setting tools, there are two known ways of regulating the driving energy, one is to use different propellant charge intensities and the other is to provide a regulating device associated with the tool. The known devices for regulating the driving energy in setting tools usually involve a volume variation of the initial combustion zone or a partial blowing-off of the explosion gases from the combustion zone into the atmosphere.

When fastening or joining sheetmetal, such as shaped sheets for copings, facings and the like, adaptation of the driving energy is of essential importance, since the driving energy or force required depends on the thickness or number of the sheets being attached as well as depending on the nature of the receiving or target material.

If, for example, the nail for attaching the sheetmetal is driven in with insufficient energy, the sheetmetal does not seat firmly against the receiving material and, as a result, is subject to vibration. If the sheetmetal does not bear tightly against the receiving material, the nails are also subject to much higher bending loads, because the lack of direct contact with the receiving material results in an enlargement of the bending arm. Moreover, if a nail is not fully driven home it leaves an uneven impression or appearance, and the appearance is of particular importance in the case of copings or facings.

If, however, the nails are driven in with too great a force, the result is, with the nails presently being used, that the heads of the nails are sheared-off and without the attachment feature provided by the head, the fastening device becomes unusable. Further, though the excess force may not be sufficient to shear-off the nail head, the bouncing of the nail head causes a partial loosening of the anchoring of the nail into the receiving material and the extraction value is considerably reduced.

In view of these characteristics, the presently used fastening elements embody a number of considerable disadvantages.

If a setting tool with a regulating device is being used, it is practically impossible for the person operating the tool to select the required adjustment, since the sheetmetal thickness and the number of sheets cannot always be determined with certainty by the operator. Apart from this, the results actually obtained rarely match the set values or they change after a few fastening operations due to fouling of the connecting passages by combustion residues which remain in the tool.

Accordingly, it has become increasingly more common to regulate the driving force or energy by varying the propellant charge. While this method has fewer imponderables, it has the disadvantage that in upgrading the propellant charge there is often an excessive increase in the force applied. It frequently occurs when a stronger propellant charge is used, after a fastening element has been driven in with insufficient force, that the increase is such that the other extreme occurs and the nail head is severed or sheared-off or because of the bouncing effect mentioned above the fastening member becomes unusable. Furthermore, continuous changing of the propellant charges, as well as carrying an assortment of such charges, causes considerable hinderance to the effective operation of the setting tool.

The primary object of the present invention is to provide a fastening element for securing sheetmetal to a receiving material so that an effective and aesthetic attachment is achieved which is largely independent of the driving energy utilized.

Therefore, in accordance with the present invention, the fastening member consists of a nail having a cylindrical shank with at least two washers in axially spaced relationship on the shank and with at least one of the washers having a dish-shaped configuration with its hollow surface facing toward the leading end or tip of the nail. At the trailing end of the shank a frusto-conical portion extends axially and widens toward the rearward end of the nail.

Due to the use of the dish-shaped washer, the frusto-conically-shaped portion prevents any sudden stoppage of the nail as it is being driven and, as a result, reduces the danger of damage to the nail. Instead, an axial distance is provided within which an increasing friction occurs during the driving process and stopping the movement of the nail takes place in an increasingly decelerating manner with increasing driving depth. The dish-shaped washer contacts the frusto-conically-shaped portion during the stopping process with the plane of the dish-surface extending approximately normal to the outer surface of the frusto-conical portion, whereby the friction effect is increased by the orientation of the surfaces disposed perpendicularly to one another. By such action, though a large range of force is used in driving in the nail, an effective attachment is always obtained. The use of the dish-shaped washer along with the frusto-conically-shaped portion on the nail affords a continuous transition for the different propellant charge intensities, so that even if the intensity has not been properly selected, the fastening is still functional and the frusto-conical portion of the nail merely penetrates more or less deeply into the washers or into the receiving material.

To provide an aesthetic appearance in the attachment of copings or facings to a receiving material, it is preferable if at least the rearward one of the washers is dish-shaped. With such an arrangement, when it is driven in, the fastening member appears as a barely perceptible projection and it has no dangerous projecting parts. Moreover, from an aesthetic point of view, as well as for functional reasons, it is advantageous if both of the washers are dish-shaped with their hollow surfaces facing toward the tip of the nail.

In particular for fastening members which must meet very high aesthetic requirements, it is advantageous if the radially outer surface of the dish-shaped washer is planar or flat. This characteristic results in a large bearing surface on the sheetmetal to be fixed to the receiving material, so that the peripheral edge of the washer is not stamped into the sheetmetal which would detract from the appearance of the attachment. Additionally, due to the increased bearing surface, the attachment value of the sheetmetal to the receiving material is increased.

In addition to the transition afforded for various propellant charge intensities and to the enhanced aesthetic appearance obtained, the fastening member of the present invention can also serve to absorb excessive driving force. In a fastening member serving predominantly to absorb driving energy, the rearward end of the frusto-conical portion is preferably followed by a head whose diameter is only slightly greater than the larger diameter of the frusto-conical portion. If the intensity of the propellant charge is too great, the head extending laterally outwardly of the frusto-conical portion contacts the dish-shaped washer after it has passed over the frusto-conical portion so that the nail is brought to a stop in a gradual manner. In this arrangement the energy imparted to the nail in the driving action no longer causes the nail head to be sheared-off, as in previously known fastening members, rather it is transformed into deformation energy with the dish-shaped washer being flattened to a greater or lesser degree depending on the amount of energy remaining in the nail. If the head of the nail is guided in a countersunk portion of the tool piston, the end face of the piston also impinges on the washer and contributes to its deformation. Depending on the manner in which it is used and the amount of excess energy that may have to be transformed, an appropriate elastic material can be selected for the washer. Additional regulation of the deforming action can be obtained by selecting the appropriate degree of curvature in the dish-shaped surface of the washer.

Furthermore, to provide the proper deforming action, the edge of the dish-shaped washer extending between its hollow surface and its oppositely directed surface can provide a narrow edge which bears against the surface of another washer located forwardly of it in the driving direction or against the sheetmetal to be attached, so that it holds fast to the oppositely directed surface and provides a greater resistance to deformation.

It has been found that a cone angle in the range of 15° to 25° is advantageous for the frusto-conical portion of the nail. Such a cone angle affords an optimum compromise between the friction to afford the continuous powder charge transition and the desired transformation of the excess energy.

The extraction value of the nail can be considerably improved by providing a knurled surface on the cylindrical shank. To prevent any breakage due to any surface cracks in the nail, it is preferable if the knurling is provided in a herringbone pattern.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
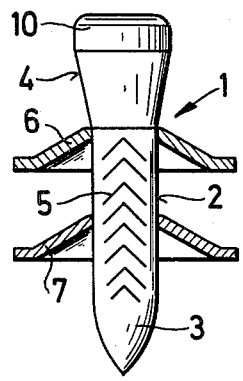
FIG. 1 is an axially extending side view of a fastening element consisting of a nail and two dish-shaped washers, shown in section.

In FIG. 1 a fastening member is shown consisting of a nail 1 having a cylindrical shank 2 terminating at its forward or leading end in an ogival tip 3 and at its trailing or rearward end in a frusto-conical portion 4 which widens toward the trailing end of the nail. The cylindrical shank 2 has a herringbone knurled surface 5 and two dish-shaped washers 6, 7 are mounted in axially spaced relationship on the shank 2. The washers have substantially the same diameter.

Figure 2:
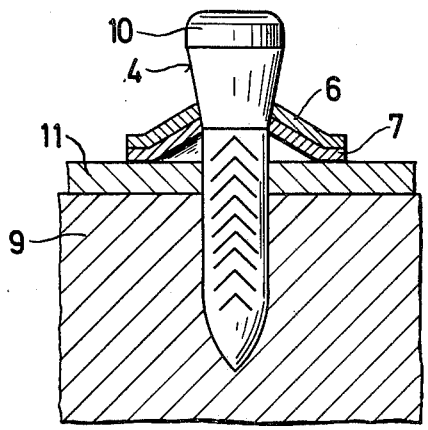
FIG. 2 is a view, similar to that in FIG. 1, with the nail and washers driven into a receiving material by a relatively low driving force.

In FIG. 2 the nail 1 is shown driven through a sheet 11 into a receiving material 9 for securing the sheet to the receiving material. As can be noted in FIG. 2, little driving energy has been expended in forcing the nail into the receiving material, since the cylindrical shank 2 has not completely penetrated into the receiving material 9 or into the sheet 11. However, the attachment of the sheet as shown in FIG. 2 is fully effective because of the action of the nail 1 and the washers 6, 7 and a favorable appearance is provided by the inserted fastening member. The effectiveness of the attachment of the fastening member and its appearance are due to the manner in which the washer 7 has shifted in the axial direction over the shank 2 into contact with the hollow surface of the washer 6 and with both of the washers seated on the frusto-conical portion 4 of the nail. The combined action of the nail and the washers affords a tensioning of the sheet 11 against the receiving material 9. Since the radially outer periphery of the hollow surface of the washers 6 and 7 is planar, a large bearing surface is provided against the sheet 11 so that there is no tendency of the washers to emboss the sheet in an unsightly manner.

Figure 3:
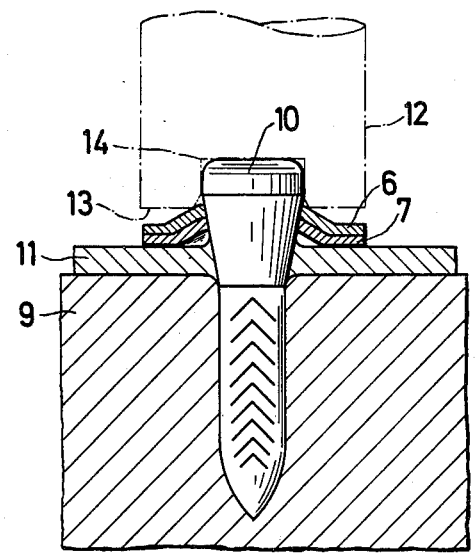
FIG. 3 is a view similar to FIG. 2, however, with the nail driven into the receiving material with a relatively high driving force.

In FIG. 3 a similar attachment of the fastening member is shown to that in FIG. 2, however, in FIG. 3 the nail has been driven into the receiving material with a much greater force. In FIG. 3, the frusto-conical portion 4 has passed through the sheet 11 and has penetrated slightly into the receiving material 9. As the frusto-conical portion 4 passes through the sheet 11 and into the receiving material 9, a considerable part of the excess driving energy has been transformed into deformation energy and the piercing action effected on the washers also dissipates a considerable amount of the energy. In FIG. 3 it is apparent that a fully effective attachment has been achieved and a favorable aesthetic appearance is provided.

In FIG. 3, the leading portion of the piston 12 in the setting tool is shown in phantom as it drives the nail 1 through the sheet 11 into the receiving material 9. As shown in FIG. 3, it can be appreciated that a complete passage of the trailing end of the nail through the washers 6 and 7 is not possible which would result in an ineffective attachment of the sheet to the receiving material, because the trailing end of the nail 1 is guided within a cutout or counter-sunk portion 14 of the piston which is arranged so that, when a relatively large excess driving force is still present, the leading end face 13 of the piston contacts the rear surface of the washer 7. Due to the action of the piston 12, the two washers 6 and 7 are pressed to the same extent toward the receiving material and it is impossible for the nail to pass fully through the washers, rather it can only pass through until the rearward end of the frusto-conical portion 4 is reached. To afford the guidance of the nail by the counter-sunk portion 14 of the piston 12, a short cylindrical portion 10 extends axially from the rearward end of the frusto-conical portion 4, note also FIGS. 1 and 2.

Figure 4:
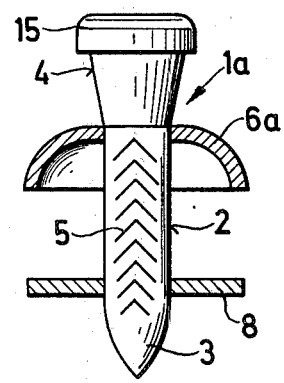
FIG. 4 is another embodiment of the invention illustrating the nail and dish-shaped washer designed for energy transformation.

In FIG. 4 another embodiment of the fastening member is shown which consists of a nail 1a and the washers 6a and 8. This fastening member is particularly useful where especially high excess driving forces are used which must be transformed into deformation energy.

Nail 1a is similar to nail 1 in that it has a cylindrical shank 2 with a herringbone pattern knurled surface 5, an ogival tip 3 and a frusto-conical portion 4 widening rearwardly from the trailing end of the cylindrical shank 2. However, as distinguished from the nail 1, in FIG. 4 the nail 1a has a head 15 which projects laterally outwardly from the wider end of the frusto-conical portion 4 so that an annular shoulder is formed by the head facing in the direction of the tip 3 of the nail. The washers 6a and 8 are spaced apart from one another in the axial direction of the cylindrical shank 2 and, as distinguished from the arrangement shown in FIG. 1, the forward washer 8 has a flat disc-like shape while the rearward washer 6a is dish-shaped. As illustrated in FIG. 4, the dish-shaped washer 6a is arcuately-shaped as compared to the more rectilinear form of the hollow surface of the washers 6 and 7 in FIG. 1. Further, in FIG. 1 the planar outer surface of the hollow surface of the washers extends transversely of the axis of the washer, however, in FIG. 4 the peripheral edge surface joining the hollow surface and the oppositely facing surface of the washer 6a is in a plane extending substantially normally of the axis of the nail 1a, that is, the rim formed by the hollow surface and oppositely facing surface of the washer 6a is disposed perpendicularly to the receiving material. Accordingly, the dish-shaped washer 6a offers a greater resistance to the nail when it is driven in at high values of excess energy and the head 15 contacts the washer 6a so that considerable energy can be dissipated in the deformation of the washer. The increased energy or force needed for the deformation of the washer is due on one hand to the arcuate configuration of the washer and, on the other hand, to the perpendicular arrangement of the rim of the washer directed toward the receiving material. In fact, as can be seen in FIG. 4, the outer diameter of the washer 6a at its rim is approximately equal to the outer diameter of the disc-like washer 8 so that the rim of the rearward washer contacts the rearwardly facing surface of the forward washer as the nail is driven into the receiving material. This arrangement of the washers counteracts sliding of the edge of the washer 6a during the deformation process.

While two different embodiments of the fastening member have been shown in FIGS. 1 and 4, they are not considered as limiting the scope of the applicants' fastening member arrangement. Rather, various forms of the nail as well as different configurations of the washers can be combined in accordance with the conditions encountered. To mention only one other possible embodiment, a nail 1a, as shown in FIG. 4, could be combined with the washers 6 and 7 as illustrated in FIG. 1.

While specific embodiments of the invention have been shown and described in detail to illustrate the application of the inventive principles, it will be understood that the invention may be embodied otherwise without departing from such principles.

What is claimed is:

1. A fastening member for use in a setting tool operated by an explosive powder charge comprising a nail having an axially extending shank, a nail tip at the forward end of the shank, and two washers positioned on said shank and spaced apart in the axial direction thereof, wherein the improvement comprises that said shank is cylindrically shaped rearwardly from said nail tip, at least one of said washers is dish-shaped with its hollow surface facing in the direction of said nail tip, each of said washers is located on the cylindrically-shaped shank and each said washer has approximately the same outside diameter so that the outer circumferential peripheries of said washers are in alignment, the at least one said dish-shaped washer is located closer to the rearward end of said shank than the other said washer, said nail having a frusto-conical portion extending axially from the rearward end of said shank and widening in the rearward direction from the circumferential periphery of said cylindrically shaped shank, said frusto-conical portion having a cone angle in the range of 15° to 25°, and said nail having a cylindricallyshaped portion extending axially from the rearward end of said frusto-conically shaped portion.

2. Fastening member, as set forth in claim 1, wherein the surface of said shank is knurled.

3. Fastening member, as set forth in claim 2, wherein the surface of said shank is knurled in a herringbone pattern.

4. Fastening member, as set forth in claim 1, wherein both of said washers are dish-shaped.

5. Fastening member, as set forth in claim 1, wherein the radially outer surface of the hollow surface of said dish-shaped washer is planar.

6. Fastening member, as set forth in claim 1, wherein said nail having a head portion located at the rearward end of said frusto-conical portion and said head portion extending transversely outwardly from the rearward end of said frusto-conical portion so that at least a narrow shoulder facing in the forward direction of said nail is formed about the rearward end of said frusto-conical portion.

7. Fastening member, as set forth in claim 1, wherein the hollow surface of said dish-shaped washer is arcuate.

8. A fastening member for use in a setting tool operated by an explosive powder charge comprising a nail having an axially extending shank, a nail tip at the forward end of said shank, and two washers positioned on said shank and spaced apart in the axial direction thereof, wherein the improvement comprises that said shank is cylindrically shaped, at least one of said washers is dish-shaped with its hollow surface facing in the direction of said nail tip, the at least one said dish-shaped washer is located closer to the rearward end of said shank than the other said washer, said nail having a frusto-conical portion extending axially from the rearward end of said shank and widening in the rearward direction from the circumferential periphery of said cylindrically shaped shank, the hollow surface of said dish-shaped washer is arcuate and in section in the axial direction of said nail the hollow surface has a rounded concave configuration from its radially inner edge adjacent said shank to its radially outer edge, and the peripheral edge of said washer joining the hollow surface with the oppositely disposed surface is in a plane normal to the axial direction of said nail.

9. A fastening member for use in a setting tool operated by an explosive powder charge comprising a nail having an axially extending shank, a nail tip at the forward end of the shank, and two washers positioned on said shank and spaced apart in the axial direction thereof, wherein the improvement comprises that said shank is cylindrically shaped, at least one of said washers is dish-shaped with its hollow surface facing in the direction of said nail tip, the at least one said dish-shaped washer is located closer to the rearward end of said shank than the other said washer, said nail having a frusto-conical portion extending axially from the rearward end of said shank and widening in the rearward direction from the circumferential periphery of said cylindrically shaped shank, the radially outer surface of the hollow surface of said dish-shaped washer being planar, and the hollow surface of said washer radially inwardly of the planar surface being frusto-conically shaped and diverging in the direction toward the nail tip from the radially inner edge of the hollow surface adjacent the shank.

* * * * *

UNITED STATES PATENT OFFICE
CERTIFICATE OF CORRECTION

Patent No. 3921495            Dated November 25, 1975

Inventor(s) Josef Braun, Manfred Hartmann, Helmut Oesterle

It is certified that error appears in the above-identified patent and that said Letters Patent are hereby corrected as shown below:

In the heading of the [75] and [73] should read as follows:

--[75] Josef Braun, Vaduz, Liechtenstein,

Manfred Hartmann, Frastanz, Austria

Helmut Oesterle, Feldkirch, Austria--.

Signed and Sealed this thirteenth Day of April 1976

[SEAL]

Attest:

RUTH C. MASON
*Attesting Officer*

C. MARSHALL DANN
*Commissioner of Patents and Trademarks*